United States Patent
Wu

(10) Patent No.: US 6,481,130 B1
(45) Date of Patent: Nov. 19, 2002

(54) LIGHT EMITTING DIODE LINEAR ARRAY WITH LENS STRIPE FOR ILLUMINATED SIGNS

(75) Inventor: Chen-Ho Wu, Los Altos Hills, CA (US)

(73) Assignee: Leotek Electronics Corporation, Taipei Hsien (TW)

( * ) Notice: Subject to any disclaimer, the term of this patent is extended or adjusted under 35 U.S.C. 154(b) by 32 days.

(21) Appl. No.: 09/637,182

(22) Filed: Aug. 11, 2000

(51) Int. Cl.[7] ............................................... G09F 13/18
(52) U.S. Cl. ........................... 40/546; 40/541; 40/563; 40/564; 362/31; 362/297
(58) Field of Search ........................ 40/541, 544, 546, 40/549, 563, 564, 572; 362/297, 298, 800, 812, 240, 241, 245, 31, 223

(56) References Cited

U.S. PATENT DOCUMENTS

| | | | | |
|---|---|---|---|---|
| 1,351,562 A | * | 8/1920 | Foster | 362/569 |
| 1,667,772 A | * | 5/1928 | Coon | 362/351 |
| 2,130,023 A | * | 9/1938 | Owe | 40/563 |
| 2,297,851 A | * | 10/1942 | Wyss, Jr. | 40/546 |
| 2,607,145 A | * | 8/1952 | Pope | 40/563 |
| 2,637,926 A | * | 5/1953 | Anderson | 40/546 |
| 4,715,137 A | * | 12/1987 | Scheve | 40/546 |
| 4,791,745 A | * | 12/1988 | Pohn | 40/546 |
| 4,918,578 A | * | 4/1990 | Thompson | 362/31 |
| 5,020,252 A | * | 6/1991 | De Boef | 40/564 |
| 5,433,024 A | * | 7/1995 | Lerner | 40/546 |
| 5,509,223 A | * | 4/1996 | Jung | 40/564 |
| 5,641,218 A | * | 6/1997 | Sakurai | 362/223 |
| 5,842,297 A | * | 12/1998 | Tung | 40/546 |
| 5,950,340 A | | 9/1999 | Woo | |
| 6,023,869 A | | 2/2000 | Durbin | |
| 6,027,235 A | | 2/2000 | Chen | |
| 6,296,376 B1 | * | 10/2001 | Kondo et al. | 362/297 |
| 6,305,109 B1 | * | 10/2001 | Lee | 40/546 |

* cited by examiner

*Primary Examiner*—Lynne H. Browne
*Assistant Examiner*—James M. Hewitt
(74) *Attorney, Agent, or Firm*—Gary Cary Ware & Freidenrich LLP

(57) ABSTRACT

A linear array of light emitting diodes with a lens stripe for evenly illuminating signs, which includes a linear array of light emitting diodes (LEDs) for producing a light output, and an elongated lens stripe. The linear array of LEDs includes an elongated mounting member and a plurality of LEDs mounted along the length of the mounting member. The elongated lens stripe is attached to the linear array of LEDs, and includes a reflector portion and a lens portion. The reflector portion has two elongated and opposing side walls that form an elongated channel. The side walls are light reflective. The LEDs are disposed inside the channel. The channel side walls reflect the light output from the LEDs toward the elongated open end of the channel. The lens portion has an elongated lens disposed along the open end of the channel for focusing the light output from the LEDs. The focused light output enters the side edge of a display board type sign for even illumination, or is projected onto the opaque front surface of a sign for even illumination.

2 Claims, 6 Drawing Sheets

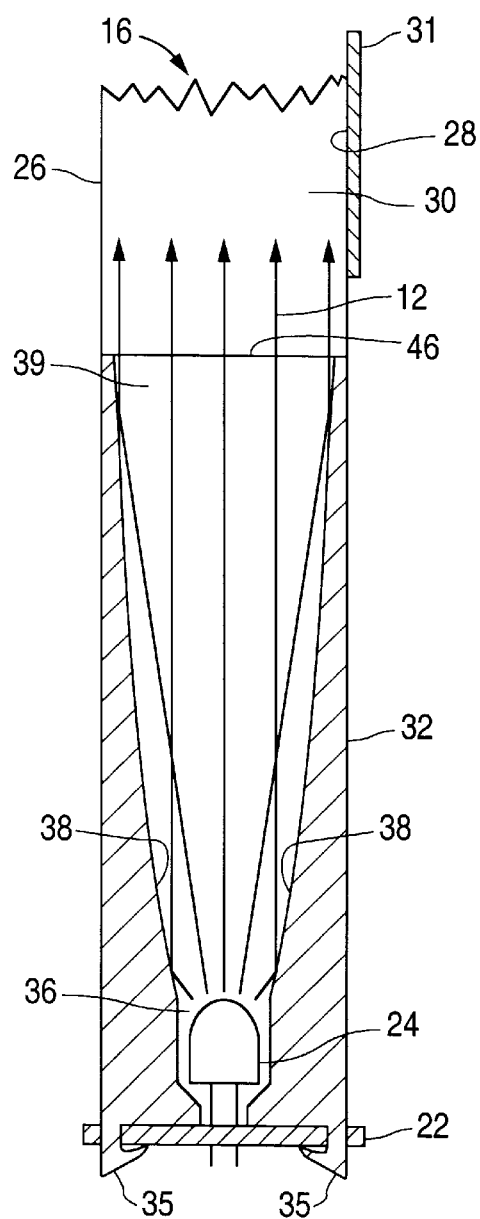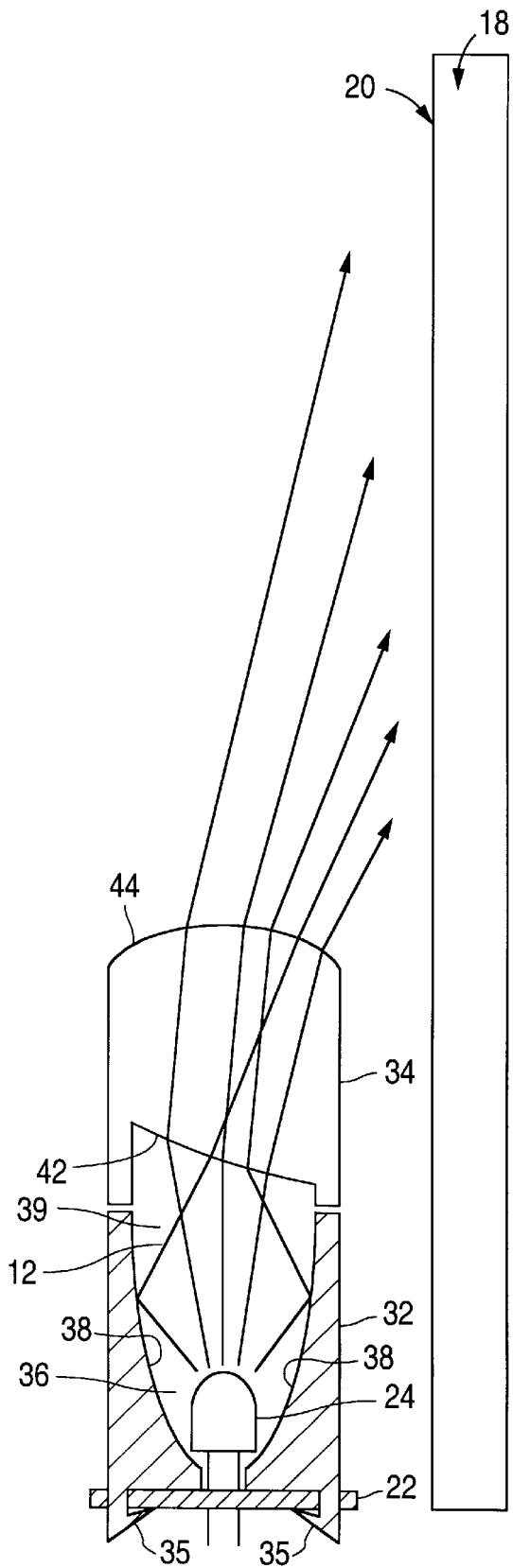
FIG. 8
FIG. 9

LIGHT EMITTING DIODE LINEAR ARRAY WITH LENS STRIPE FOR ILLUMINATED SIGNS

FIELD OF THE INVENTION

The present invention relates to illuminated signs, and in particular to a lens stripe for collimating light from an array of light emitting diodes to illuminate display board and opaque types of signs.

BACKGROUND OF THE INVENTION

Most light emitting diodes (LED's) transmit light in the axial direction of the LED within a certain viewing angle, 360 degrees symmetrically around the LED axis. This type of emission pattern is easiest and least costly to manufacture. Thus, most LED lamps or signs employing LED's are designed with the LED's facing out from the face of the sign to emit light away from the sign surface.

LEDs are not presently suitable for many other sign applications. For example, display board signs are made of a transparent or hallow material, whereby light is coupled into the sign through one or more of its side edges. The light travels through the interior of the display board and is diffused out through its front and/or back faces. However, it is difficult to efficiently couple light from LEDs into display board signs, let alone evenly illuminate such signs with LEDs. The diverging LED output tends to brightly illuminate only that portion of the display board closest to the LEDs, thus requiring additional LEDs to adequately illuminate the darkest portions of the sign. Some diverging light from the LED's is not even coupled into the sign, which represents wasted light. Some prior art devices attempt to alleviate such problems by using oval LED lamps with narrower viewing angles, or by shaping the sign with a reducing thickness as the light travels through the sign, or by mounting LED's along all four edges, as illustrated in U.S. Pat. Nos. 6,023,869; 5,950,340; and 6,027,235. But, these solutions are complex, expensive, increase energy consumption and achieve only limited success in maximizing coupling efficiency and illumination consistency.

Another example of a sign application for which standard LEDs are not suitable are standard illuminated opaque highway signs. These signs have a front sign plate that is typically illuminated by lights mounted in front of the sign and oriented to direct light back onto the front sign plate. The lights are typically turned on all night, and thus use significant amounts of electricity. LED's are more energy efficient that standard lights, but LEDs are not used to illuminate such signs because of the diverging light output, the cost of using inefficient LEDs, or complexity and inefficiency of using oval LED lamps.

There is a need for an LED design that efficiently couples the light generated by LEDs into the sign (or onto the sign plate) to evenly illuminate display board and opaque signs with the fewest possible LEDs.

SUMMARY OF THE INVENTION

The present invention solves the aforementioned problems by providing a lens stripe that efficiently couples light generated by LEDs into display board or opaque signs. The lens stripe easily attaches to the LED arrays or supporting printed circuit boards, and has a simple design that efficiently directs light to the sign, reduces cost of production, and increases energy efficiency.

The present invention is a focused linear array of light emitting diodes for illuminating a sign, which includes a linear array of light emitting diodes (LEDs) for producing a light output, and an elongated lens stripe. The linear array of LEDs includes an elongated mounting member and a plurality of LEDs mounted along a length of the mounting member. The elongated lens stripe is attached to the linear array of LEDs, and includes a reflector portion and a lens portion. The reflector portion has two elongated and opposing side walls that form an elongated channel. The side walls are light reflective, wherein the LEDs are disposed inside the channel such that the side walls reflect the light output from the LEDs toward an elongated open end of the channel. The lens portion has an elongated lens disposed along the open end of the channel for focusing the light output from the LEDs onto the sign.

In another aspect of the present invention, an illuminated sign includes a sign and a focussed linear array of light emitting diodes. The sign has a front face, a rear face and a side edge. The focussed linear array of light emitting diodes (LEDs) produces a light output for illuminating the sign, and includes an elongated mounting member, a plurality of LEDs mounted along a length of the mounting member, and an elongated lens stripe attached to at least one of mounting member and LEDs. The lens stripe includes a reflector portion having two elongated and opposing side walls that form an elongated channel, and a lens portion. The channel side walls are light reflective, wherein the LEDs are disposed inside the channel such that the side walls reflect the light output from the LEDs toward an elongated open end of the channel. The lens portion has an elongated lens disposed along the open end of the channel for focusing the light output from the LEDs onto the sign to evenly illuminate the sign.

In yet another aspect of the present invention, an illuminated sign includes a sign and a focussed linear array of light emitting diodes. The sign has a front face, a rear face and a side edge. The focussed linear array of light emitting diodes (LEDs) produces a light output to illuminate the sign, and includes an elongated mounting member, a plurality of LEDs mounted along a length of the mounting member, and an elongated lens stripe attached to at least one of mounting member and LEDs. The lens stripe includes a reflector portion having two elongated and opposing side walls that form an elongated channel. The side walls are light reflective and the LEDs are disposed inside the channel. The side walls have a non-planar shape for reflecting and focusing the light output from the LEDs onto the sign to evenly illuminate the sign.

Other objects and features of the present invention will become apparent by a review of the specification, claims and appended figures.

BRIEF DESCRIPTION OF THE DRAWINGS

FIG. 8 is a cross-sectional view of a seventh alternate embodiment of the present invention.

FIG. 9 is a cross-sectional view of a eighth alternate embodiment of the present invention.

DETAILED DESCRIPTION OF THE PREFERRED EMBODIMENTS

Figure 1A:
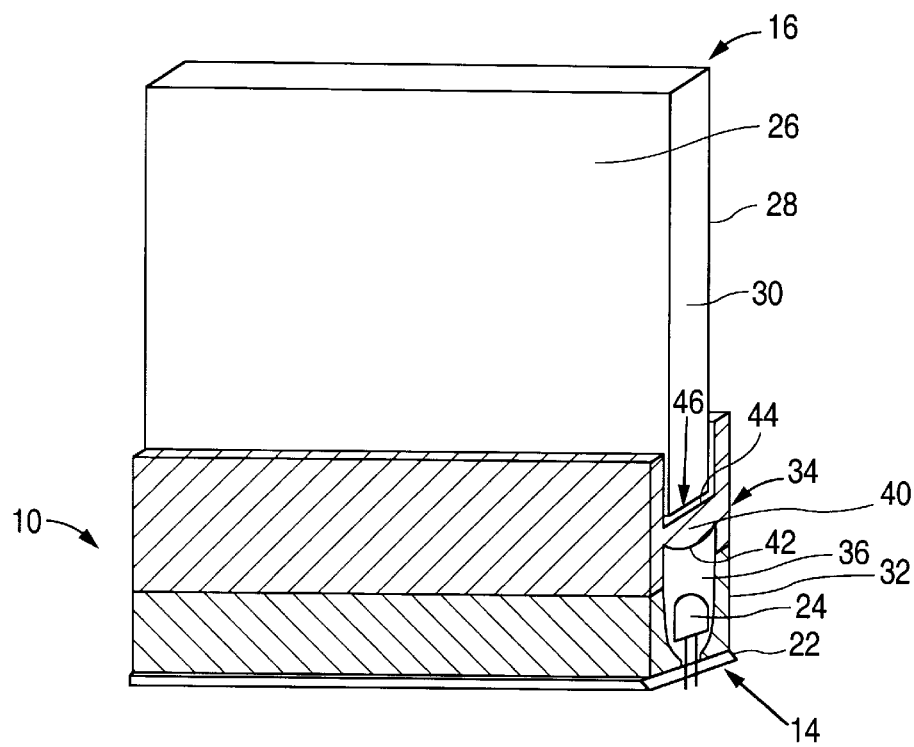
FIG. 1A is a perspective view of the illuminated sign of the present invention.

The present invention is a lens stripe 10 that focuses the light output 12 of an LED linear array 14 to evenly and efficiently illuminate a display board sign 16 or the front face 18 of an opaque sign 20.

Figure 1B:
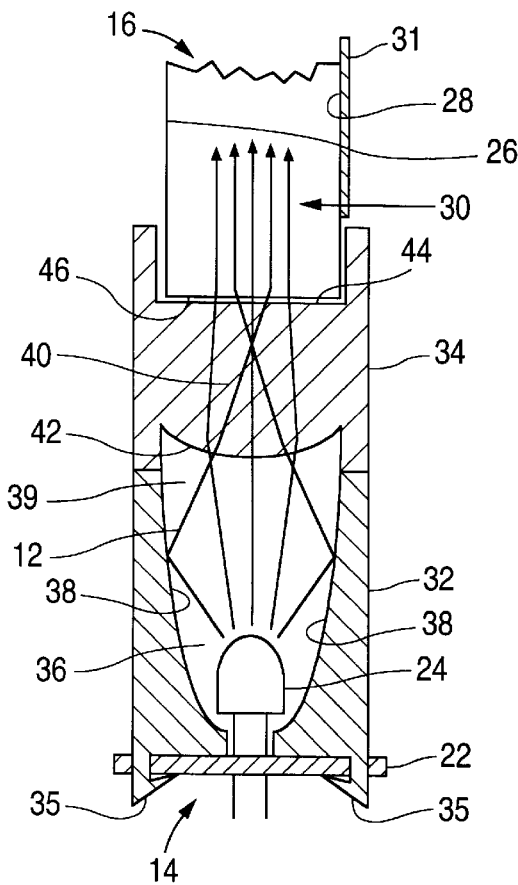
FIG. 1B is a cross-sectional view of the illuminated sign of the present invention.

The LED linear array 14 includes a printed circuit board (or other rigid mounting member) 22 upon which a plurality of light emitting diodes (LEDs) 24 is mounted, as illustrated in FIGS. 1A and 1B. The LEDs 24 are preferably mounted in a single line along the length of the printed circuit board 22. LEDs 24 emit a light output 12 that is transmitted in the axial direction of the LED within a certain viewing angle, 360 degrees symmetrically around the LED axis. The present invention is ideal for use with standard LEDs configured in linear arrays 14, which are well known in the art.

Display board signs 16 typically have front and back faces 26 and 28 upon which indicia are placed, and a transparent interior 30 between the front/back faces 26/28, as illustrated in FIGS. 1A and 1B. If only the front face 26 of the display board sign is used for indicia, a reflective material 31 can be applied or attached to the back face 28 to increase the illumination of the front face 26. Light coupled into the interior of the display board sign 16 is diffused out the front and/or rear faces 26/28, providing back light for making opaque indicia viewable from significant distances. Alternately, the front/rear faces 26/28 are opaque and light is diffused from the sign only through the indicia. Front/rear faces 26/28 can be sanded, and/or the interior can be slightly opaque or colored, to better diffuse the light out the face(s) 26/28.

The display board sign 16 is illuminated through its side edge 46 by the lens stripe 10 of the present invention, which includes a reflector portion 32 and a lens portion 34. The reflector portion 32 attaches to the printed circuit board 22 of LED linear array 14 (preferably using locking tabs 35), and forms an elongated channel 36 in which the LEDs 24 are disposed. The channel 36 has reflective side walls 38 that are curved to direct the light output 12 from the LED's 24 out the channel top opening 39 and toward the display board sign 16. Conventional reflective coatings can be used on side walls 38 to enhance reflectivity. The lens portion 34 is attached to the reflector portion 32, and forms an elongated lens 40 that extends along the channel top opening 39 and over all the LEDs 24. Lens 40 includes a bottom surface 42 that is rounded to create a lensing action that focuses the light output 12, and a top surface 44 which is flat and is positioned adjacent to or abutting against side edge 46 of the display board 16.

The combination of the curved shape of reflective side walls 38 and lens 40 focuses light output 12 of the LEDs 24 to maximize the amount of light coupled into the display board sign 16 through its side edge 46, and to create the desired illumination of the interior of the display board sign 16 so that the sign appears evenly illuminated as viewed from a distance. Sufficient amounts of light pass through the center of the display board sign to maximize the evenness of illumination even at the far end of the display board sign. Some light still enters the display board sign 16 at an angle to sign 16, where the light repeatedly bounces off front/rear faces 26/28 for better illumination of those faces.

The reflective side walls 38 and lens 40 have a focusing effect for the light component diverging in a direction perpendicular to the plane of the display board sign (and therefore perpendicular to the longitudinal direction of the LED linear array 14). The orthogonal light component (diverging in a direction in the plane of the display board sign) need not be focused, as this light component more efficiently couples into and illuminates the display board sign 16 without the aid of curved side walls 38 and lens 40.

Figure 2:
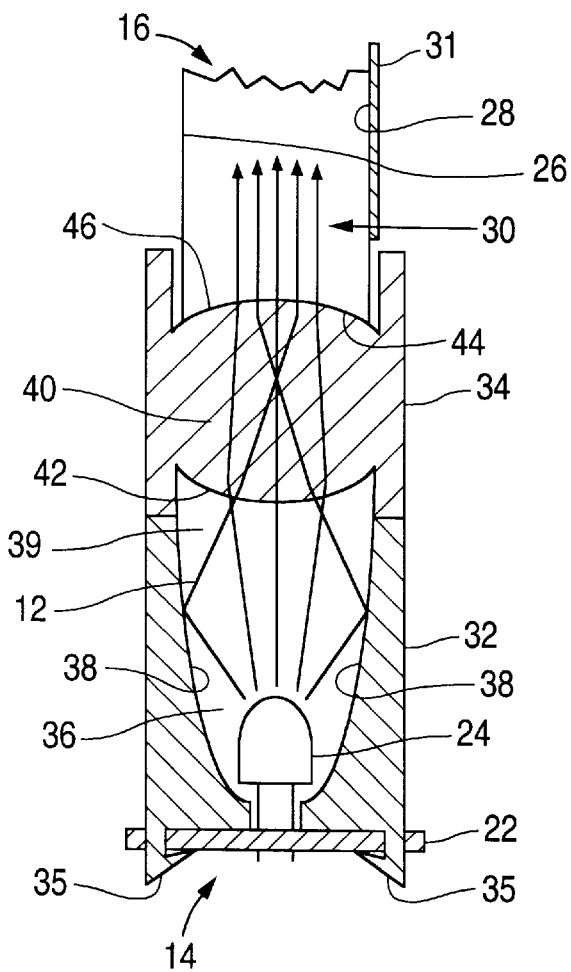
FIG. 2 is a cross-sectional view of a first alternate embodiment of the present invention.
Figure 3:
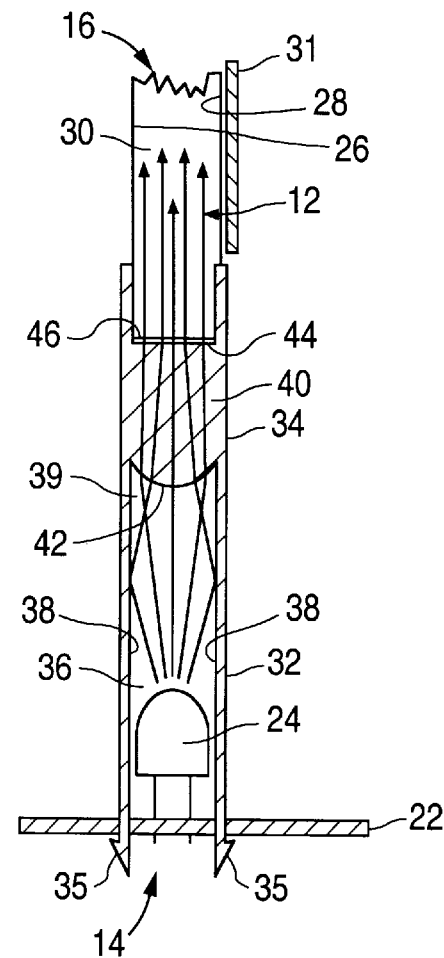
FIG. 3 is a cross-sectional view of a second alternate embodiment of the present invention.
Figure 4:
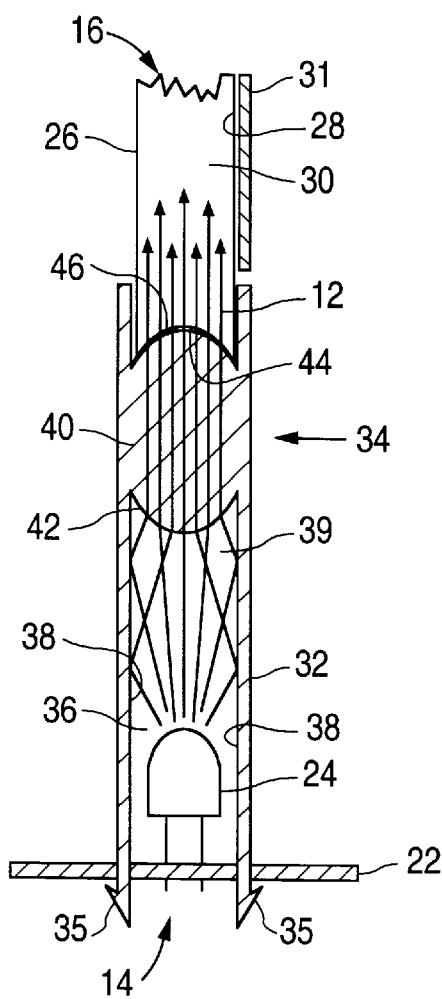
FIG. 4 is a cross-sectional view of a third alternate embodiment of the present invention.
Figure 5:
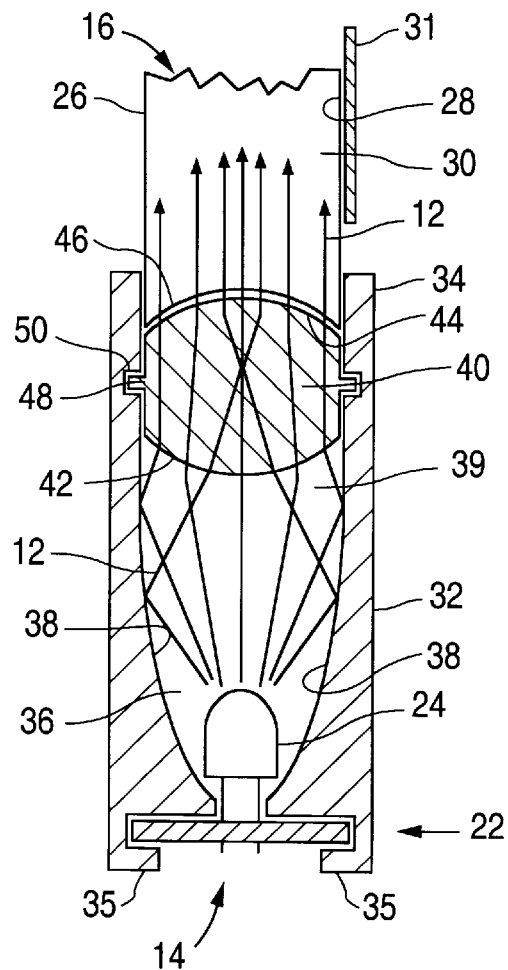
FIG. 5 is a cross-sectional view of a fourth alternate embodiment of the present invention.
Figure 6:
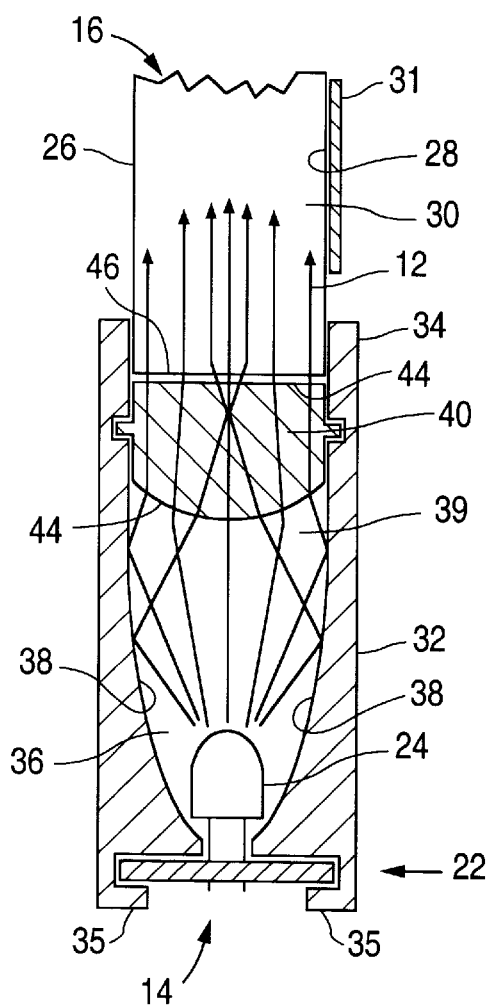
FIG. 6 is a cross-sectional view of a fifth alternate embodiment of the present invention.

The basic configuration of the lens stripe 10 can be slightly varied and still fall within the scope of the present invention, as illustrated in FIGS. 2–6. For example, the top surface 44 of lens 40 can be flat, which is preferable because it matches the flat shape of standard display board side edges 46 (see FIGS. 1A–1B, 3, and 6). Or, the lens top surface 44 can be rounded to provide additional focusing power to lens 40 (see FIGS. 2, 4, and 5). With a rounded top lens surface 44, the display board side edge 46 is also preferably rounded for better coupling efficiency. The channel reflective side walls 38 can be rounded to help focus the light (see FIGS. 1A–1B, 2, 5 and 6), or flat so long as the focussing power of lens 40 is strong enough to adequately focus the light output 12 (see FIGS. 3 and 4). Reflector and lens portions 32/34 can be integrally formed as a single member (see FIGS. 3 and 4), or can be separate elements attached together (FIGS. 1A–1B and 2). Lens portion 34 can have side tabs 48 that slide into and engage with grooves 50 formed in the side walls 38 of channel 36 (see FIGS. 5 and 6).

Figure 7:
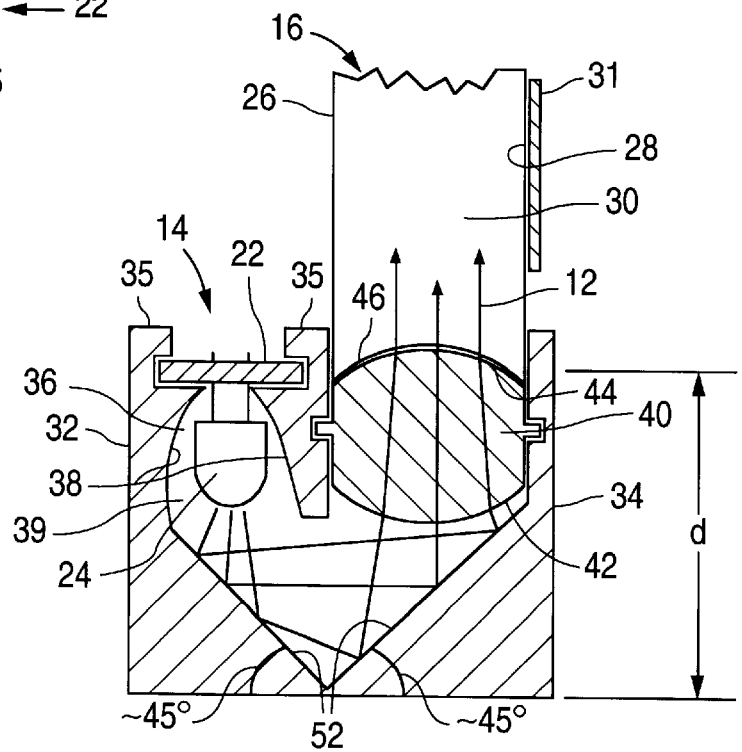
FIG. 7 is a cross-sectional view of a sixth alternate embodiment of the present invention.

FIG. 7 illustrates yet another alternate embodiment of the present invention, where the LEDs 24 and channel 36 are disposed adjacent to, and face the same direction as, the display board side edge 46 through which the light is coupled. The reflector portion 32 includes two reflecting surfaces 52 each oriented at approximately 45 degrees from the bottom of the display sign. The reflecting surfaces 52 fold the light output 12 from the LEDs 24 approximately 180 degrees and toward the side edge 46. This folded configuration of lens stripe 10 has a reduced dimension d in the plane of the display board sign 16, which is ideal for applications where the length of the combined display board sign and lens stripe needs to be minimized.

FIG. 8 illustrates another alternate embodiment of the present invention, where the lens portion 34 is omitted, and the reflective side walls 38 of channel 36 are shaped to substantially focus the light output 12 before it enters the display board sign 16. The advantage of this embodiment is the elimination of the lens 40 for reduced assembly and manufacture costs, but the drawback is that it may require a longer reflector portion 32 in order to achieve the desired focusing effect by the channel side walls 38.

FIG. 9 illustrates one further alternate embodiment of the present invention, which is used to illuminate the front face 18 of an opaque sign 20. The LED linear array 14 and lens stripe 10 attached thereto are disposed slightly in front of the front face 18 along one of its side edges. The top and/or bottom surfaces 42/44 of lens 40 are asymmetrically formed to re-focus and evenly project the light output 12 onto the front face 18 of sign 20. The lens strip 10 can include any of the structural permutations illustrated in FIGS. 1–8.

Figure 10:
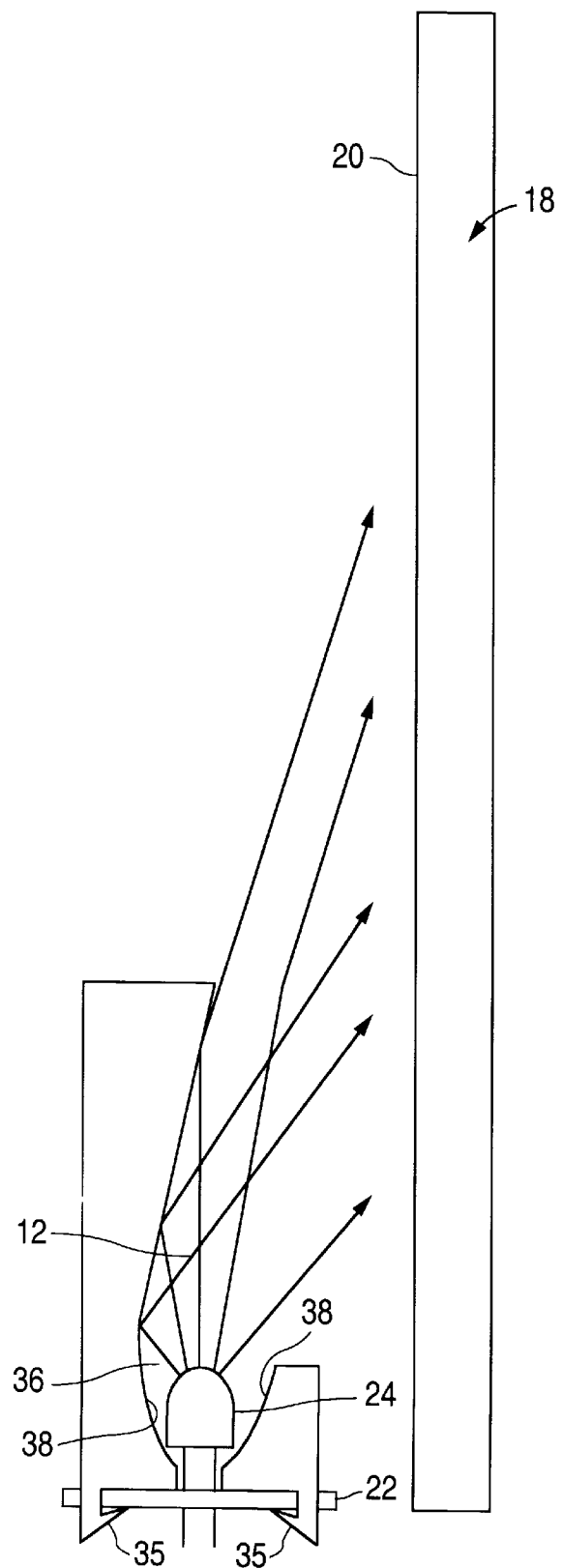
FIG. 10 is a cross-sectional view of a ninth alternate embodiment of the present invention.

FIG. 10 illustrates the illumination of an opaque sign where the lens portion 34 is omitted. In this embodiment, the reflective side walls 38 of channel 36 are shaped to focus and evenly project the light output 12 onto the front face 18 of sign 20. The display board sign 16 and lens stripe 10 may be made out of any heat tolerant conventional plastic, acrylic, polycarbonate and/or glass materials, and coated with conventional reflective coatings.

It is to be understood that the present invention is not limited to the embodiments described above and illustrated herein, but encompasses any and all variations falling within the scope of the appended claims. For example, the interior of the display board sign 16 can be hollow or made of a pseudo transparent material. Lens stripe 10 can attach to the LEDs themselves and not to PC board 22 (i.e. locking tabs 35 directly engage with the LEDs). The LED linear array can be formed with a width greater than one LED wide. The lens bottom surface 42 can be flat and the top lens surface 44 can be rounded to provide the desired lensing action. Finally, a plurality of LED linear arrays 14 with lens stripe assemblies 10 can be affixed to multiple edges of the display board sign 16 or opaque sign 20.

What is claimed is:

1. A focused linear array of light emitting diodes for illuminating a sign, comprising:
   a linear array of light emitting diodes (LEDs) for producing a light output, the linear array of LEDs includes:
      an elongated mounting member, and
      a plurality of LEDs mounted along a length of the mounting member; and
   an elongated lens stripe attached to the linear array of LEDs, the lens stripe includes:
      a reflector portion having two elongated and opposing side walls that form an elongated channel, the side walls are light reflective, wherein the LEDs are disposed inside the channel such that the side walls reflect the light output from the LEDs toward an elongated open end of the channel, and
      a lens portion having an elongated lens disposed along the open end of the channel for focusing the light output from the LEDs onto the sign;
   wherein:
      the elongated lens has an entrance surface facing the channel and an exit surface opposing the entrance surface,
      one of the entrance surface and the exit surface has a non-planar shape for focusing the light output from the LED's,
      the channel side walls include grooves formed therein, and
      the lens portion includes tabs that engage with the grooves for securing the lens portion to the reflector portion.

2. An illuminated sign, comprising:
   a sign having a front face, a rear face and a side edge; and
   a focussed linear array of light emitting diodes (LEDs) for producing a light output to illuminate the sign, the focussed linear array of LEDs includes:
      an elongated mounting member,
      a plurality of LEDs mounted along a length of the mounting member, and
      an elongated lens stripe attached to at least one of mounting member and LEDs, the lens stripe including:
         a reflector portion having two elongated and opposing side walls that form an elongated channel, the side walls are light reflective, wherein the LEDs are disposed inside the channel such that the side walls reflect the light output from the LEDs toward an elongated open end of the channel, and
         a lens portion having an elongated lens disposed along the open end of the channel for focusing the light output from the LEDs onto the sign to evenly illuminate the sign;
   wherein:
      the elongated lens has an entrance surface facing the channel and an exit surface opposing the entrance surface,
      one of the entrance surface and the exit surface has a non-planar shape for focusing the light output from the LED's,
      the channel side walls include grooves formed therein, and
      the lens portion includes tabs that engage with the grooves for securing the lens portion to the reflector portion.

* * * * *